United States Patent [19]

Nazzer

[11] 3,892,825

[45] July 1, 1975

[54] UNITARY STACKED PRESSURE TOWER

[76] Inventor: Don Barkley Nazzer, 861 George St., Sidney, Canada

[22] Filed: June 14, 1972

[21] Appl. No.: 262,521

Related U.S. Application Data

[63] Continuation-in-part of Ser. No. 859,344, Sept. 19, 1969, abandoned.

[52] U.S. Cl. ............... 261/114 R; 261/151; 423/580
[51] Int. Cl. ............................................. B01f 3/04
[58] Field of Search ........................................ 423/580; 261/113–114, 150, 151; 55/463; 23/260

[56] References Cited
UNITED STATES PATENTS

| | | | |
|---|---|---|---|
| 2,550,679 | 5/1951 | Engel et al. | 261/114 X |
| 2,678,199 | 5/1954 | Koch | 261/113 X |
| 2,787,526 | 4/1957 | Spevack | 423/580 |
| 2,952,525 | 9/1960 | Harteck | 423/580 |
| 3,411,884 | 11/1968 | Thayer | 423/580 |
| 3,492,795 | 2/1970 | Guerrieri | 55/463 |

OTHER PUBLICATIONS

Hengstebeck, R. J. Distillation, Page 292, Reinhold Pub. Corp., Feb, 26, 1962.

*Primary Examiner*—Tim R. Miles
*Assistant Examiner*—Richard L. Chiesa
*Attorney, Agent, or Firm*—R. A. Eckersley

[57] ABSTRACT

The heavy water isotope, deuterium oxide $D_2O$, is obtained by isotopic exchange between water and hydrogen sulphide gas in a plant having hot and cold exchange zones provided in a stacked tower structure, with the cold tower portion surmounting the hot tower portion and having a heat exchange dehumidifier section interposed therebetween within the unitary tower.

2 Claims, 1 Drawing Figure

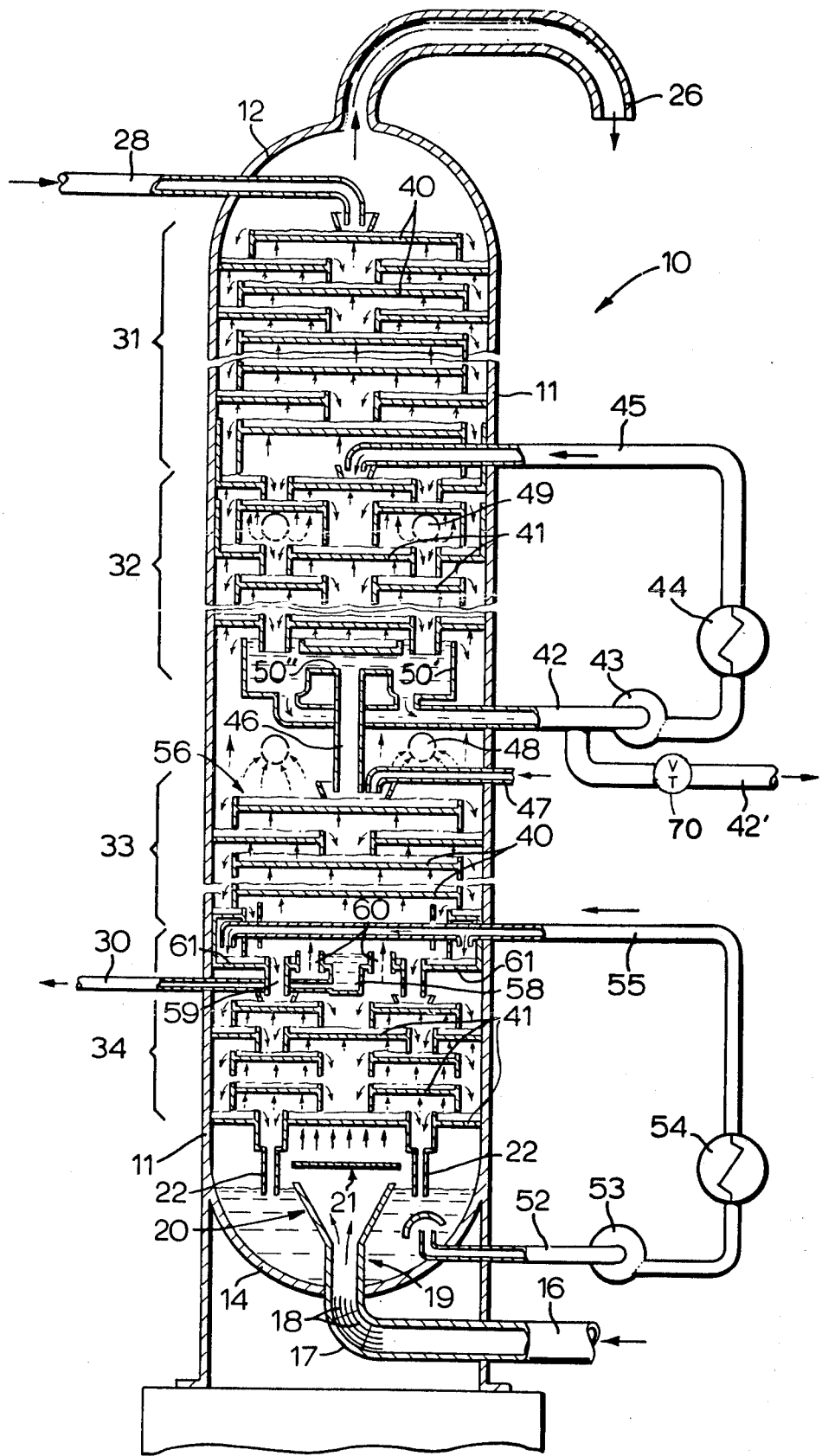

UNITARY STACKED PRESSURE TOWER

This application is a continuation-in-part of Application Ser. No. 859,344 filed Sept. 19, 1969 and now abandoned.

This invention is directed to a unitary stacked pressure tower for use in carrying out a dual temperature isotope exchange process between two fluids.

The carrying out of dual temperature exchange processes such as the isotope exchange process used in separating deuterium requires the provision of a hot exchange zone and a cold exchange zone. Owing to the fact that the quantity of gas moving upwardly through the towers in counterflow isotopic exchange with downflowing liquid is substantially constant in both the hot and cold sections it is evident that the cross sectional area required will be much greater for the hot tower than for the cold tower, and for this reason it has been prior practice to utilize two separate tower structures.

It has been found however that for a number of good reasons it is economic to provide a unitary pressure tower of substantially uniform diameter having the dual temperature zones in superposed relation, with at least one fluid conditioning zone interposed between the hot and the cold sections, and a number of unobvious advantages thereby accrue.

The present invention thus provides a stacked tower structure for use in a two fluid dual temperature isotope exchange process in two zones maintained at different, substantially constant temperatures, using hydrogen sulphide gas and water in a counterflow heavy water concentration process, including an upright unitary pressure vessel of substantially uniform cross section having a cold isotope exchange zone and a hot isotope exchange zone, with one said zone superposed over the other zone; fluid transfer means at the top and the bottom of the zones for the passage of gas and water therethrough, and a temperature conditioning zone intermediate the isotope exchange zones to provide heat exchange between the two fluids in moving in counterflow relation through the conditioning zone, including heat exchange circuit means connecting the temperature conditioning zone with a heat exchanger located externally of the tower, to condition both fluids while within the conditioning zone to the temperature of the respective adjacent tower exchange zone to which the respective fluid flows, whereby the effective exchange of deuterium in the isotope exchange zones is promoted.

In defining the tower as being of substantially uniform section it will be understood that a variation in the order of 10 percent in the tower diameter, between the two sections is covered by the foregoing language.

In considering the operating characteristics of hot and cold towers having water flowing downwardly and hydrogen sulphide moving in counterflow relation therewith it has been found that while theoretically the cold tower should be of appreciably smaller diameter than the hot tower, due to the increased foaming characteristic, which changes close to the hydration point of the gas, at the lower temperature the tower diameter has to be greater than theoretical conditions would indicate.

The significance of certain of the advantages of the unitary stacked tower over individual towers of the prior art, in relation to the provision of foundations and ground area required can be better gauged by the following typical characteristics of such a tower; diameter about 30 feet, overall height about 280 feet, plate thickness about 3½ inches, internal tray provision about 130 trays and operating at about 300 psi with a cold zone at 30° C and a hot zone at 130°C.

An additional advantageous aspect of the stacked tower is the greatly improved gas handling characteristic, with the gas flowing in at the bottom and out at the top of the tower and requiring no intervening pipe runs between the individual sections within the tower.

In addition to the foregoing advantages, certain additional operating advantages accrue from the use of a unitary stacked tower. Thus the hold-up of inventory on the transition tray forming the bottom of the cold tower portion is significantly less than the quantity of inventory that would be retained in the bottom of a cold tower, in accordance with previous arrangements. In turn, the reduced hold-up of liquid improves the response time characteristic of the tower, thereby improving control characteristics, to shorten the time taken in this cycle in responding to flow adjustment. Advantage is also obtained in the reduction of pressure gradient within the tower.

In operating with hydrogen sulphide gas it is imperative to avoid turbulent flow conditions of the gas when using a tower formed of carbon steel, as such a tower structure obtains natural protection by the formation of an iron sulphide coating which protects the steel of the tower. The occurrence of turbulent flow conditions tends to destroy the protective iron sulphide coating, so that the rate of attack of the hydrogen sulphide on the tower structure is greatly increased. The alternative provision of a stainless steel tower suffers from the disadvantage of extreme cost, such that in a plant of the size to provide 400 tons of deuterium per year the extra capital cost involved by the use of stainless steel towers would run into several millions of dollars.

Certain embodiments of the present invention are described, reference being had to the accompanying drawing which is a diagrammatic sectional elevation of the unitary tower.

Referring to the drawing the tower 10 comprises a cylindrical shell portion 11 having end caps 12 and 14, with a gas inlet 16 to the lower end cap 14, and a gas outlet 26 from the upper end cap 12. The main water inlet feed is at 28, and the water outlet at 30.

The tower 10 has a cold section 31, a dehumidifier or gas cooling and water warming section 32, a hot section 33 and a humidifier section 34 in which the gas is warmed and water cooled.

In the cold and hot sections 31 and 33 is shown a series of perforated decks 40, and in the dehumidifier and humidifier sections 32 and 34 is shown a series of perforated decks 41, both of which types of deck permit liquid or froth to pass or flow across, and gas to pass up through. The decks 40, 41 are arranged in stacked array, being represented in diagrammatic form. The sections 31, 33 are for purposes of isotope exchange between gas and water, while the sections 32, 34 primarily provide temperature conditioning.

The dehumidifier section 32 is provided with a cooling water circuit having an outlet 42 to pump 43 which is connected with the cooler 44 leading to the inlet 45.

The humidifier 34 has a heating water circuit having an outlet 52 connected with pump 53 leading to heater 54 and thence by way of inlet 55 to the humidifier 34.

The gas inlet 16 is provided with an elbow section 17 having guide vanes 18 located therein connecting with the bottom opening of the tower 19 and a diffusion section 20 for pressure recovery. The items 16, 17, 19 and 20 are of circular cross-section. The guide vanes 18 turn the flow through the elbow 17 with minimum turbulence and provide smooth flow conditions at the entry to the diffusion section 20 which has an included angle about 7° for maximum effectiveness. Gas velocity at the exit of 20 is reduced to about half of line velocity thereby turbulence to about one quarter of what it would otherwise be without the vane corner and diffuser. The benefits are concentric entry for the main gas stream entering the tower with minimum turbulence and no direct impingement on the tower walls by erosive jets. Adverse dynamic effects on the bottom deck of the humidifier section are also reduced.

To further improve gas flow conditions and minimize spray pick-up by the flowing gas, a plate or screen 21 is suspended over the diffusion section outlet, and the liquid flow from the bottom humidifier deck is conducted through downspouts 22 to discharge below the level of the diffusion section outlet.

Referring to the transition section between the hot section 33 and the humidifier 34, provision is made for downward liquid flow 56 from the hot section, return flow from the heater 55, effluent drawoff 30, to waste, downward flow to the humidifier, and upward flow of gas through the transition section. The returning heated flow 55 will be gaseous and bubbling and is discharged into one or more stainless steel lined chambers from whence fluid can flow out across a transition deck plate 61 which is unperforated as compared with decks 40 and 41, through a slot along the bottom edge of each chamber.

The downward flowing liquid flows down into the same deck and mixes with flow 55. The liquid flows preferentially into one or more sumps 58 from which a controlled flow of effluent 30 is drawn. The balance of the liquid overflows into downspouts 59 and is in turn distributed over the top deck of the humidifier section. The upward gas flow passes through the deck plate by way of sleeves or chimneys 60. The wall of the tower in the region between the transition deck plate and the bottom of the hot section is normally lined with stainless steel.

Referring to the transition section between the dehumidifier 32 and the top of the hot tower 33, provision is made for collecting the downward liquid flow, for drawing off all or a portion of the downward liquid flow, and allowing that portion which is not drawn off to overflow downwards to the hot section 33, to provide a gas draw-off for process purposes, and a liquid process return feed to the top of the hot section. Reference is made to the copending Application Reference Ser. No. 878,316 filed Nov. 20, 1969 and now abandoned, concerning particulars of the flow control system. The water outlet 42 serves both the cooling water circuit and process draw-off 42' which is controlled by a suitable throttle valve 70. The thus controlled overflow portion 46 of the downward flow which may thus be balanced in quantity to suit gas flow conditions in the hot section, and the process return feed flow 47 passes in enclosed ducts or downspouts to distribution troughs or spargers which distribute the flow to the top deck of the hot section. The intake spargers 48 for the gas draw-off are located sufficiently above the top deck of the hot section (5' approx.) to avoid carryover of liquid droplets into the gas pipework. The downward flow from the downcomers of the dehumidifier section is collected in troughs and downspouts leading to the take-off sump 50, comprising an outer sump portion 50' serving the outlet 42, and an inner weir portion 50" to control overflow.

Referring to the upper portion of the dehumidifier or fluid conditioning section 32, provision is made for the return of cooling circuit flow 45, for gas process return feed by way of inlets 49, by means of which a selected flow of gas from a subsequent stage of the heavy water plant (not shown) is returned to the tower, and for downward liquid flow from the cold isotope exchange section 31 to the dehumidifier section through the spaces occupied by the cooling water returns and the gas return. The liquid flows downwardly through these spaces and is carried in enclosed stainless steel ducts or downspouts to minimize turbulence or agitation and so prevent erosion of the protective film on the carbon steel tower walls. The tower walls are also protected by stainless baffles in the region of gas feed to protect against droplet impingement on the wall surfaces.

While the cooling water circuit within the tower for the dehumidifier 32 is shown as being an open liquid circuit it will be understood that an isolated cooling circuit employing condensing coils may be alternatively employed. This also applies in the case of the humidifier section 34, for the heating circuit portion thereof.

What I claim as new and desire to secure by Letters Patent is:

1. A stacked tower structure for carrying out a dual fluid isotope exchange process in two zones maintained at different, substantially constant temperatures, using hydrogen sulphide gas and water in a counterflow heavy water concentration process, including; an upright unitary pressure vessel of substantially uniform cross section having a cold isotope exchange zone and a hot isotope exchange zone, with said cold zone superposed over said hot zone; fluid transfer means at the top and bottom of said zones for passage of gas and water therethrough including gaseous fluid extraction means at the top of said hot zone for the removal of hot deuterium-enriched fluid therethrough, a temperature conditioning zone intermediate said exchange zones to provide direct heat exchange between cold water flowing downwardly from said cold zone and hot gas flowing upwardly from said hot zone including heat exchange circuit means connecting said temperature conditioning zone with a heat exchanger located externally of said tower to provide cold water circulating downwardly through said zone in mixing relation with said gas and water to provide complementary cooling to said conditioning zone, to condition both fluids while within said conditioning zone to the temperature of the respective adjacent tower exchange zone to which the respective fluid flows, and water flow control means between said intermediate zone and said hot zone for controlling the quantity of water passing to said hot zone whereby the balanced exchange of deuterium in said hot isotope exchange zone is promoted.

2. The stacked tower structure as claimed in claim 1, said water flow control means including extraction means for withdrawing said water at a controlled rate from the tower.

* * * * *